US009861077B2

(12) United States Patent
Aked-Hurditch (10) Patent No.: US 9,861,077 B2
(45) Date of Patent: Jan. 9, 2018

(54) LEASH ACCESSORY

(71) Applicant: Jaan Aked-Hurditch, Whistler (CA)

(72) Inventor: Jaan Aked-Hurditch, Whistler (CA)

(*) Notice: Subject to any disclaimer, the term of this patent is extended or adjusted under 35 U.S.C. 154(b) by 90 days.

(21) Appl. No.: 14/791,259

(22) Filed: Jul. 3, 2015

(65) Prior Publication Data

US 2016/0007572 A1  Jan. 14, 2016

Related U.S. Application Data

(60) Provisional application No. 62/023,187, filed on Jul. 11, 2014.

(51) Int. Cl.
*A01K 27/00* (2006.01)
*A01K 15/02* (2006.01)

(52) U.S. Cl.
CPC .......... *A01K 27/005* (2013.01); *A01K 15/025* (2013.01); *A01K 27/003* (2013.01); *A01K 27/008* (2013.01)

(58) Field of Classification Search
CPC .... A01K 15/02; A01K 15/025; A01K 27/003; A01K 27/005; A01K 27/008
USPC .......................................... 119/707, 795, 858
See application file for complete search history.

(56) References Cited

U.S. PATENT DOCUMENTS

| | | | |
|---|---|---|---|
| 4,974,549 A * | 12/1990 | Gordon | A01K 27/00 119/793 |
| 6,223,694 B1 | 5/2001 | Rubin | |
| D460,586 S | 7/2002 | Holt et al. | |
| 6,453,851 B1 | 9/2002 | Holt et al. | |
| 6,460,488 B1 * | 10/2002 | Manzella | A01K 27/003 119/712 |
| 6,827,045 B1 | 12/2004 | Willner et al. | |
| 7,685,972 B2 | 3/2010 | Zacho et al. | |
| 8,413,613 B1 | 4/2013 | Smith | |
| 2008/0137994 A1 | 6/2008 | Urbina | |
| 2009/0101071 A1 * | 4/2009 | Vogl | A01K 27/006 119/161 |
| 2009/0173761 A1 * | 7/2009 | Berry | A01K 27/006 224/250 |
| 2009/0217885 A1 * | 9/2009 | Peter | A01K 15/026 119/709 |
| 2010/0006576 A1 | 1/2010 | Berry | |
| 2012/0035007 A1 * | 2/2012 | Sanna | A63B 43/00 473/575 |
| 2013/0298847 A1 | 11/2013 | McAllister | |

(Continued)

OTHER PUBLICATIONS

Search and Examination Report dated Nov. 30, 2015 in connection with GB application No. 1511730.2.

(Continued)

*Primary Examiner* — Lisa L Tsang (57) ABSTRACT

A detachable handle can make it easier to control an animal attached to a leash. The detachable handle can include a pair of subassemblies configured to secure the leash between a pair of gripping surfaces. In some embodiments the gripping surfaces are ribbed. In other or the same embodiments the gripping surfaces are magnetically attracted to each other. In some embodiments the handle is substantially spherical. In certain embodiments the handle can be used as a dog toy. In some embodiments the handle has an internal compartment which is configured to hold water, clean-up bags, pet treats, etc.

12 Claims, 10 Drawing Sheets

(56) References Cited

U.S. PATENT DOCUMENTS

2014/0158064 A1    6/2014  Cooligan-Knoefel
2014/0270931 A1*   9/2014  Jager .................... A01K 15/025
                                                         403/343

OTHER PUBLICATIONS

Don-stop Product, retrieved from https://translate.google.com.au/translate?hl=en&sl=ja&u=http://don-stop.com/&prev=search, Jan. 2016.
Insta-grip ® Control Handle Nylon Dog Leash, retrieved from http://www.coastalpet.com/products/product/spl04.aspx, Jan. 2016.
Kong Control Grip Plus Reflective Leash, retrieved from http://www.amazon.com, Jan. 2016.

* cited by examiner

LEASH ACCESSORY

CROSS-REFERENCE TO RELATED APPLICATIONS

This application claims priority benefits from U.S. Provisional Application No. 62/023,187 filed on Jul. 11, 2014 entitled "Leash Mate". The '187 provisional is hereby incorporated by reference in its entirety.

FIELD OF THE INVENTION

The present invention relates to accessories for leashes, and, in particular, detachable accessories for pet leashes.

BACKGROUND OF THE INVENTION

There are a number of different types of leashes (or leads). For walking a dog, some of the more popular types are retractable leads, traffic leads (less than a foot long) and standard length traditional leads (typically 4 to 8 feet long).

Retractable leads allow the user to lengthen and shorten the lead as the situation entails. The benefit of a traffic lead is that its short length can provide the user with very close and secure control over the dog. Many users, for reasons such as simplicity and affordability, choose to use a standard-length, traditional lead.

Standard length leads give the dogs freedom to move as they like when the users allow. The length of a standard lead can create a difficulty when the user requires closer control over the dog and needs to shorten the lead. This situation is encountered frequently, such as when approaching other dogs, walking through a crowd of people, or crossing a busy road. Generally, in this situation, the user wraps the lead around their hand of wrist, or simply holds the lead with their bare hand in order to shorten the effective, length of the lead, and to bring the dog under closer control.

Wrapping the lead around the hand or wrist can result in injury to the user, especially with larger dogs. In some instances people have had their fingers broken whilst employing this technique, for example when the dog has attempted to chase, bolt or charge.

Simply holding the lead along its length, as described above, is also inadequate as most people cannot obtain the required grip to prevent the lead from slipping, especially when trying to control larger dogs, horses or other animals. There is also a risk of rope burn as the lead is pulled from the user's grip.

Other techniques such as bunching the lead in the user's hand do not eliminate or alleviate the risk of rope burn, and can be time-consuming to employ. Typically, when close control of the animal is needed, time is of the essence, and it can be difficult to fold or bunch the lead quickly enough.

Another approach of adding control to a standard lead involves combining a traffic-style handle with a standard-length lead. A shortcoming of this approach is that the handle is fixed in position along the lead, and the position may not be well suited to the user.

In yet another approach, the user ties a large knot, or creates a loop, in the lead. A shortcoming of this approach is that the knot or loop may not provide a suitable grip. Additionally the position of the knot or loop cannot be adjusted without untying the knot or loop, and retying it. Furthermore, tying a knot shortens the lead which can be undesirable. In addition, if the knot is large enough to form a suitable grip, the knot can cause the lead to swing from side to side when the knot is not being held.

SUMMARY OF THE INVENTION

A detachable leash handle can include a first subassembly and a second subassembly, wherein the first subassembly includes a first body and a first gripping surface and the second subassembly includes a second body and a second gripping surface. The detachable leash handle can also include an adjustable fastening mechanism operable to urge the first gripping surface toward the second gripping surface to secure a leash interposed between the first and the second gripping surfaces.

In some embodiments the adjustable fastening mechanism includes a male thread on the first subassembly and a matching female thread on the second subassembly, wherein the male thread has two arcuate segments extending from the first body that define a slot therebetween. The slot able to accommodate a leash interposed between the first and the second gripping surfaces. In some embodiments the first gripping surface is urged toward the second gripping surface by rotating the male thread within the matching female thread.

In other embodiments the adjustable fastening mechanism includes a hinge connecting the first and second subassemblies and a ratchet with a tooth on the first subassembly and a set of angled teeth on the second subassembly, wherein the hinge and the ratchet are configured to define a slot therebetween. In some embodiments the slot is able to accommodate a leash interposed between the first and the second gripping surfaces; wherein the first gripping surface is urged toward the second gripping surface by engaging the tooth on the first assembly with one of the set of angled teeth on the second subassembly.

In some embodiments the detachable leash handle can also include an internal compartment configured to hold at least one of a clean-up bag and a pet treat. In other or the same embodiments the detachable leash handle can include a point of attachment configured to attach an accessory to the leash handle.

In some embodiments the first and second bodies are substantially hemispherical in shape. In other or the same embodiments the exterior surfaces of the first and second bodies have one or more indentations.

In certain embodiments at least one of the first and the second gripping surfaces includes an array of protrusions. In some embodiments at least one of the first and the second gripping surfaces is a ribbed surface.

In some embodiments the first and the second gripping surfaces are substantially planar so that the slot formed is able to accommodate a strap leash. In other embodiments the first and the second gripping surfaces are concave and cooperate to define a cylindrical slot to accommodate a cord leash.

In certain embodiments the detachable leash handle is operable as a dog toy when detached.

An animal restraint assembly includes a detachable leash handle with a first subassembly and a second subassembly. The first subassembly can include, a first body and a first gripping surface. The second subassembly can include a second body and a second gripping surface. The animal restrain assembly can also include an adjustable fastening mechanism and a leash interposed between the first and the second gripping surfaces, wherein the adjustable fastening mechanism is operable to urge the first gripping surface toward the second gripping surface to secure the leash.

In some embodiments the adjustable fastening mechanism includes a male thread on the first subassembly and a matching female thread on the second subassembly, wherein the male thread comprises two arcuate segments extending from the first body that define a slot therebetween. The slot is able to accommodate a leash.

In some embodiments the first gripping surface is urged toward the second gripping surface by rotating the male thread within the matching female thread to secure the leash.

The animal restraint assembly can also include at least one of a collar and a harness attached to the leash.

DETAILED DESCRIPTION OF PREFERRED EMBODIMENT(S)

The animal leash accessory overcomes shortcomings of the prior art by providing; a grip or handle that can be mounted, at a desired position along a lead, with enough securing force that it can be held by a user and used as a leash handle, without slipping along the leash.

In some embodiments, the animal leash accessory comprises two parts and a coupling mechanism that is able to clamp a length of leash placed, or fed, between the two parts. In other embodiments, the leash accessory is a singular unitary piece. The accessory can be manufactured or configured to attach to different types of leashes, such as strap leashes or cords.

The leash accessory described in this application provides a handle (or grip) that is attached to a leash (or lead) used for restraining a dog, horse, other animal, or even a child. In some uses, the leash accessory can be used in combination with a leash and/or a harness. As described below, in one embodiment, the accessory provides an approximately spherical handle comprising two approximately hemispherical halves attached to one another by a screw thread. The leash is positioned between the two halves and is clamped tightly between them when the two halves are screwed together.

The male thread is slotted to form two arcuate segments, and to allow the leash to run through the handle and contact with a gripping surface on each of the two halves. Friction created by the grip of the two halves on the leash is sufficient to prevent, or at least reduce the chance of the leash from slipping through the accessory, so that the accessory can be used as a handle for the leash. Other suitable mechanisms, such as a hinge and ratchet system, can be used to cause the two halves to grip the leash with sufficient force to prevent, or at least reduce the chance of the leash from slipping.

In the two embodiments described below, and illustrated in FIGS. 1A-8, the accessory has an approximately spherical shape. Other suitable shapes can be used, including, for example, but not limited to, a cube, a cuboid, a cylinder, a cone, a triangular prism, a hexagonal prism, and a combination of these shapes. The shapes can be rounded or chamfered, if desired.

The accessory can be made of plastic, resin, polyurethane, rubber, metal, wood or other suitable material or composite. In some embodiments, the material is non-toxic. In other embodiments, the material glows in the dark.

The material can be injection-molded, manufactured using a 3D printer or by another suitable process. The two halves of the accessory can each be manufactured from more than one piece. Alternatively, each half can be a unitary structure. The accessory can comprise more than one material. For example, the gripping surface can be manufactured from a material that provides greater friction, such as a rubberized material.

Unlike other leash handles, the accessory described in this application can attach to the leash, and detach from the leash. When attached, the accessory can provide an alternative place at which the handler can hold the leash. Moreover, in some embodiments, the slot in the male thread, through which the leash runs, allows the accessory to be moved along the leash when the grip between the two halves is loosened. Using this mechanism, the length of leash can be adjusted without detaching the accessory from the leash.

The surfaces within the accessory in contact with the leash can have a suitable profile, for example, but not limited to, a smooth profile, a ribbed profile, and a profile comprising geometrically shaped objects (or protrusions) such as cones. The profile can be selected to provide additional grip to the leash to prevent, or at least reduce, slipping when the assembly is wider load.

The detailed embodiments, associated drawings and corresponding specific description is to be used for the purpose of disclosure only and is not intended to impose unnecessary limitations on the claims. As above, other embodiments can be utilized and structural changes can be made without departing from the scope of the invention.

When describing elements of FIGS. 1-5 and FIG. 9, the same reference number is used to identify elements that are the same or substantially similar to each other in the different views illustrated in FIGS. 1-5 and FIG. 9.

Figure 6:
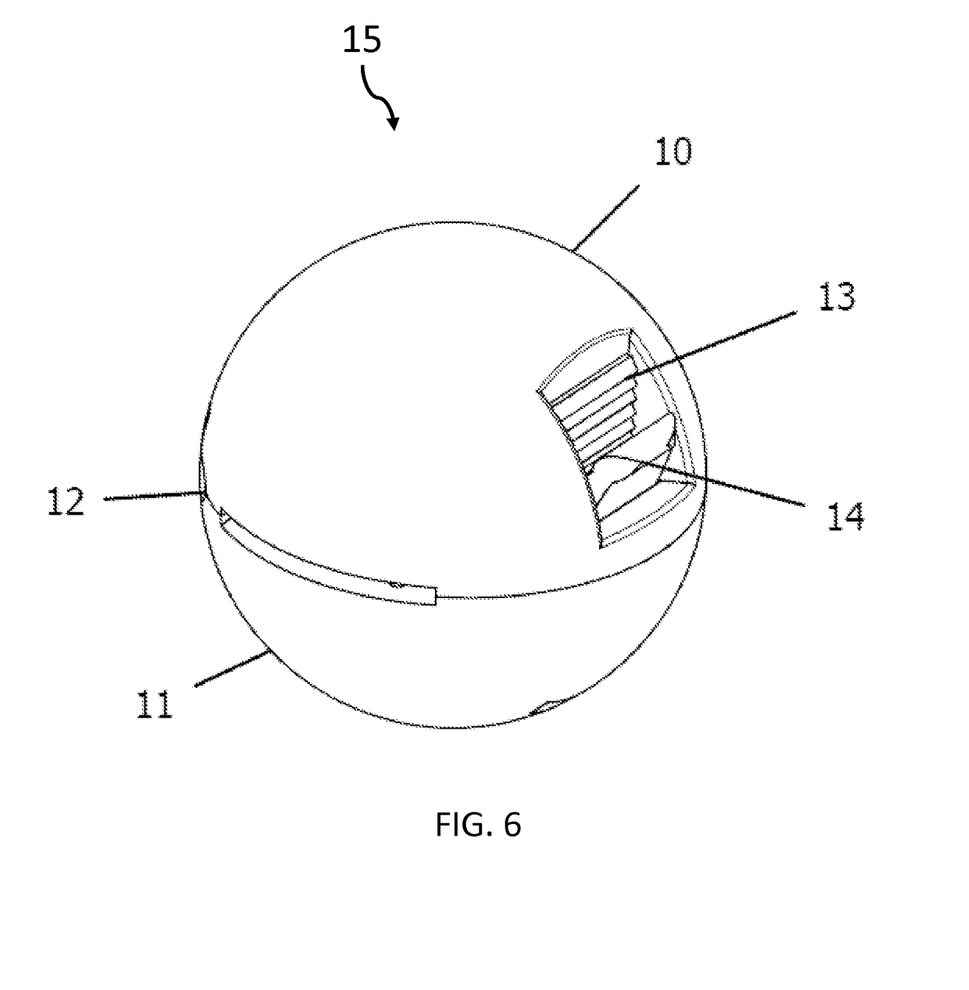
FIG. 6 is a perspective view of another embodiment of a leash accessory, such as the leash accessory of FIGS. 1A and 1B.
Figure 7:
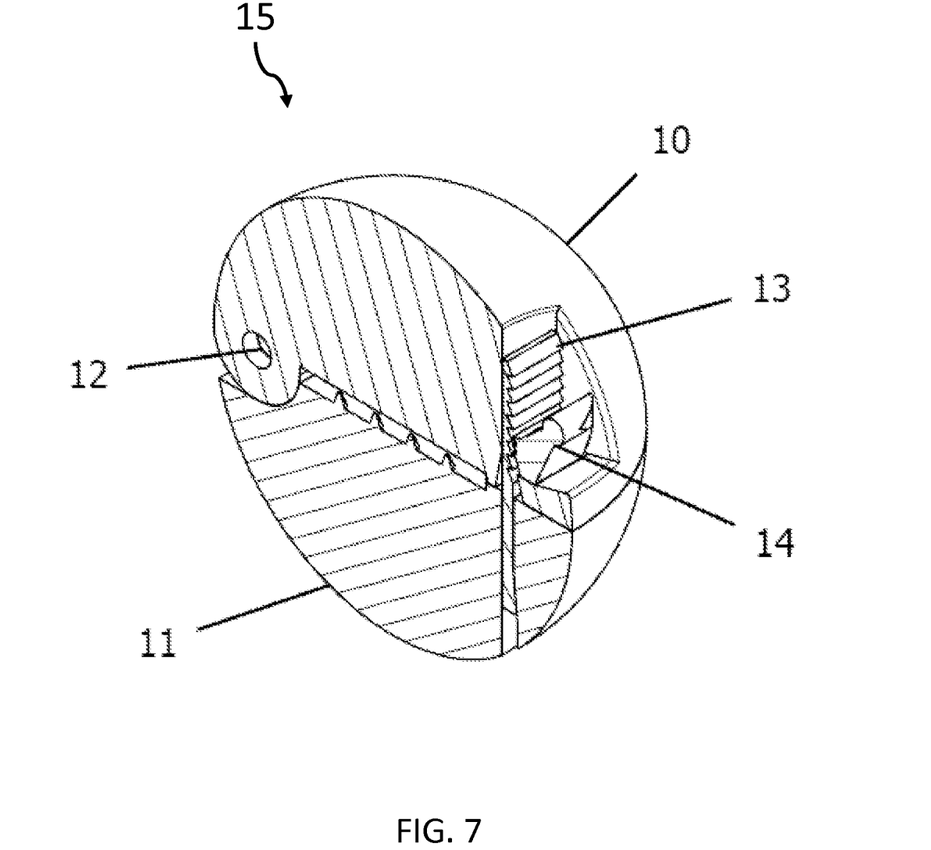
FIG. 7 is a cross-sectional, perspective view of the leash accessory of FIG. 6.
Figure 8:
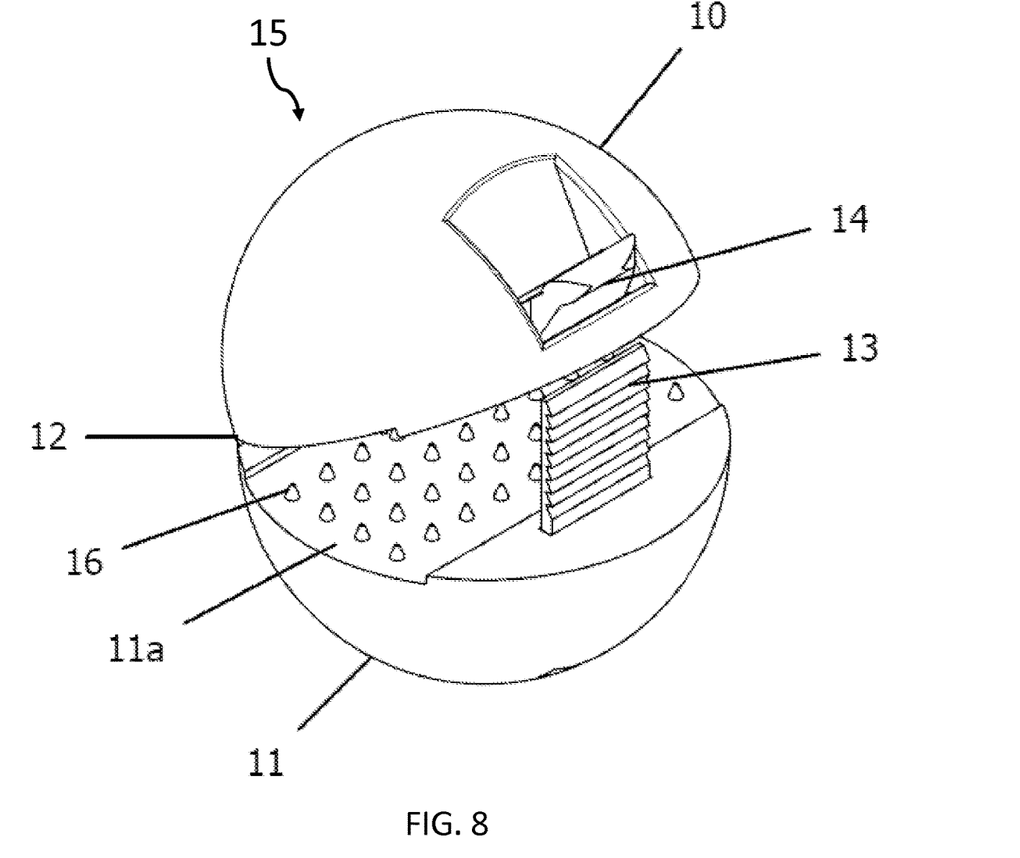
FIG. 8 is a perspective view of the leash accessory of FIG. 6, opened to accept a leash.

When describing elements of FIGS. 6-8, the same reference number is used to identify elements that are the same or substantially similar to each other in the different views illustrated in FIGS. 6-8.

Figure 1A:
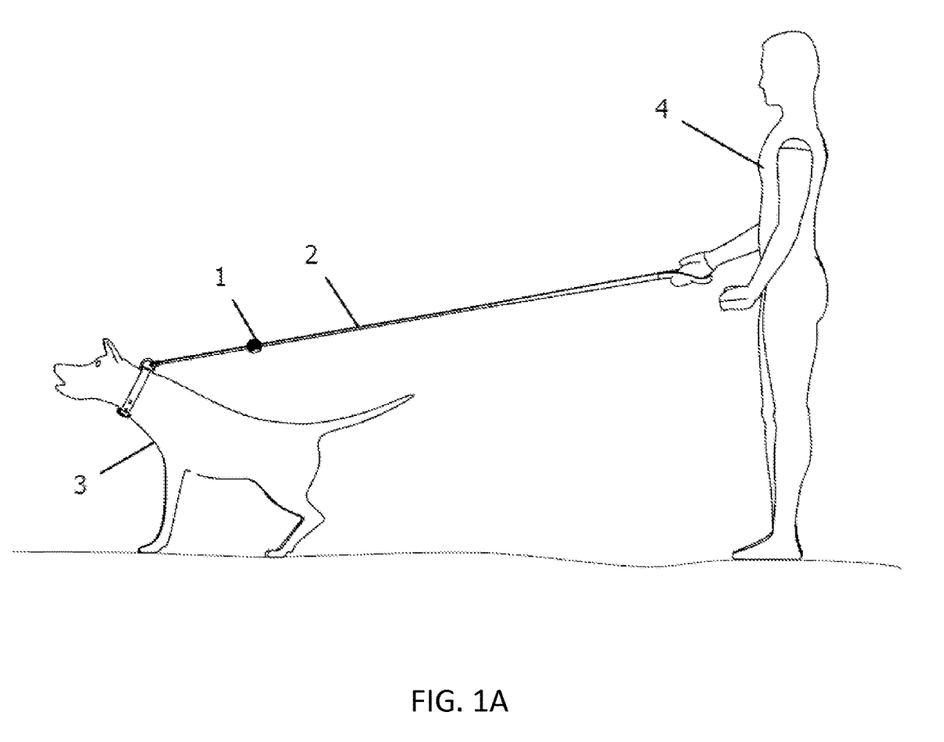
FIG. 1A is drawing of a leash accessory attached to a leash, while the leash accessory is not in use.

FIG. 1A is a drawing of leash accessory 1 attached to leash 2 while leash accessory 1 is not in use. One end of leash 2 is attached to an animal, such as dog 3. The other end of leash 2 can be held by user 4. Leash accessory 1 is attached to leash 2 at an intermediate point between the two ends of leash 2. As illustrated, user 4 operates leash 2 as he/she would without leash accessory 1. Leash 2 can, for example, be a standard-length lead.

Figure 1B:
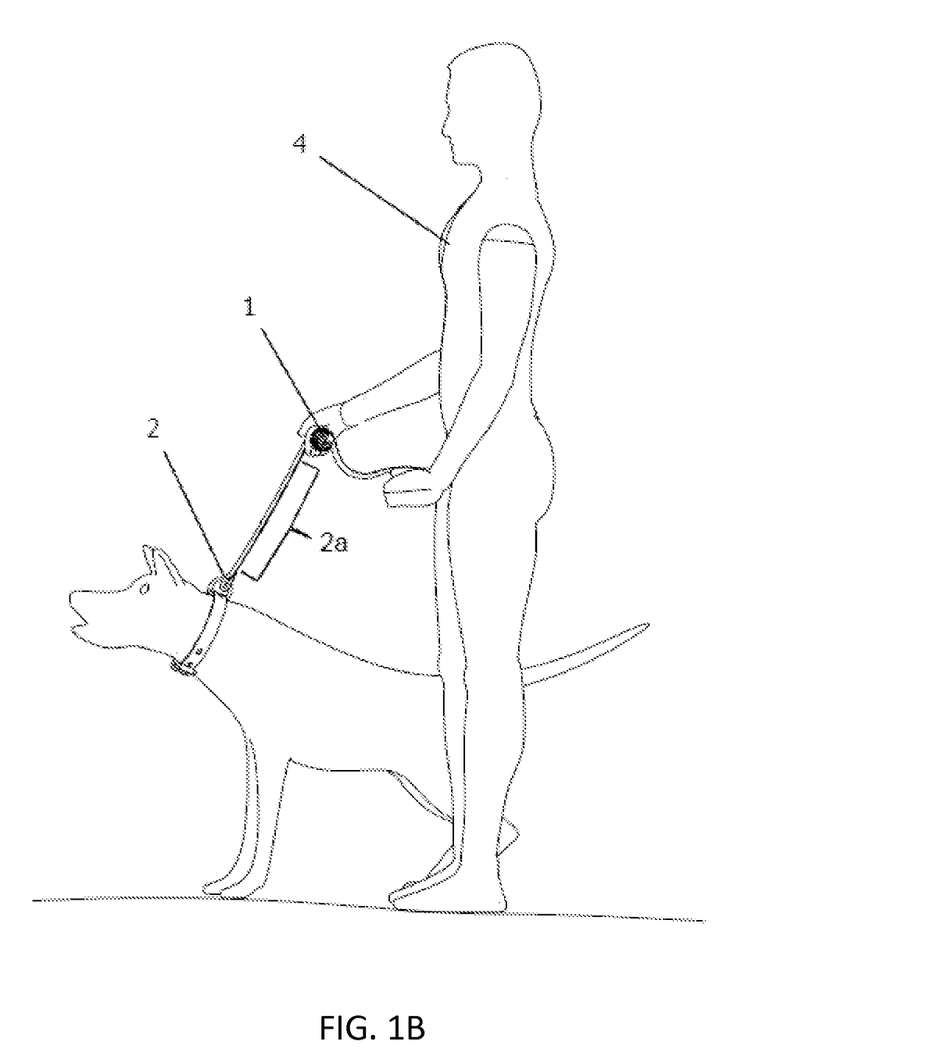
FIG. 1B is a drawing of the leash accessory of FIG. 1A attached to a leash, while the leash accessory is in use.

FIG. 1B is a drawing of leash accessory 1 of FIG. 1 while leash accessory 1 is in use. User 4 holds leash accessory in one hand and controls dog 3 using the now shortened portion 2a of leash 2. User 4 can, for example, hold the remaining portion of leash 2 in the other hand.

User 4 can employ more than one leash accessory 1 along the length of leash 2, for example to provide more than one option for handling dog 3.

Figure 2:
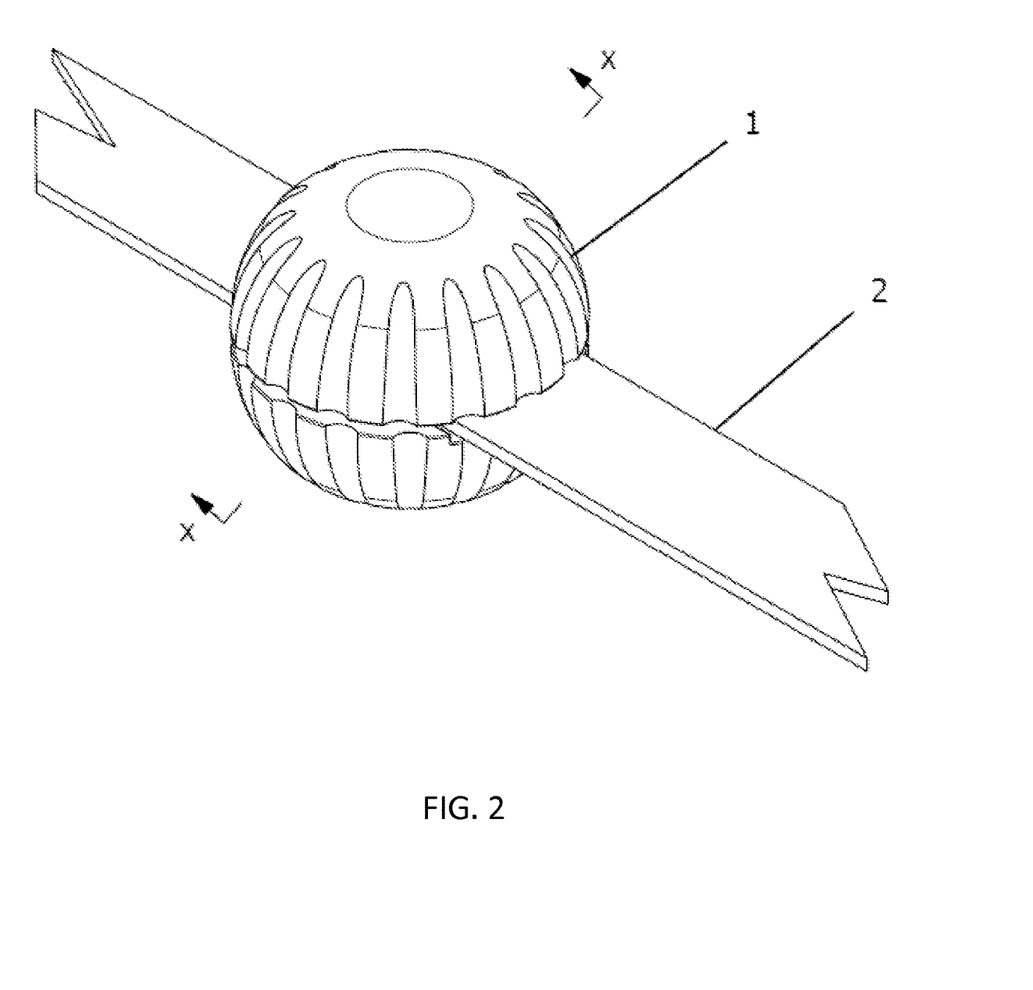
FIG. 2 is a perspective view of the leash accessory of FIGS. 1A and 1B.

FIG. 2 is a close-up, perspective view of leash accessory 1 of FIGS. 1A and 1B. Leash accessory 1 attaches to leash 2.

Figure 3:
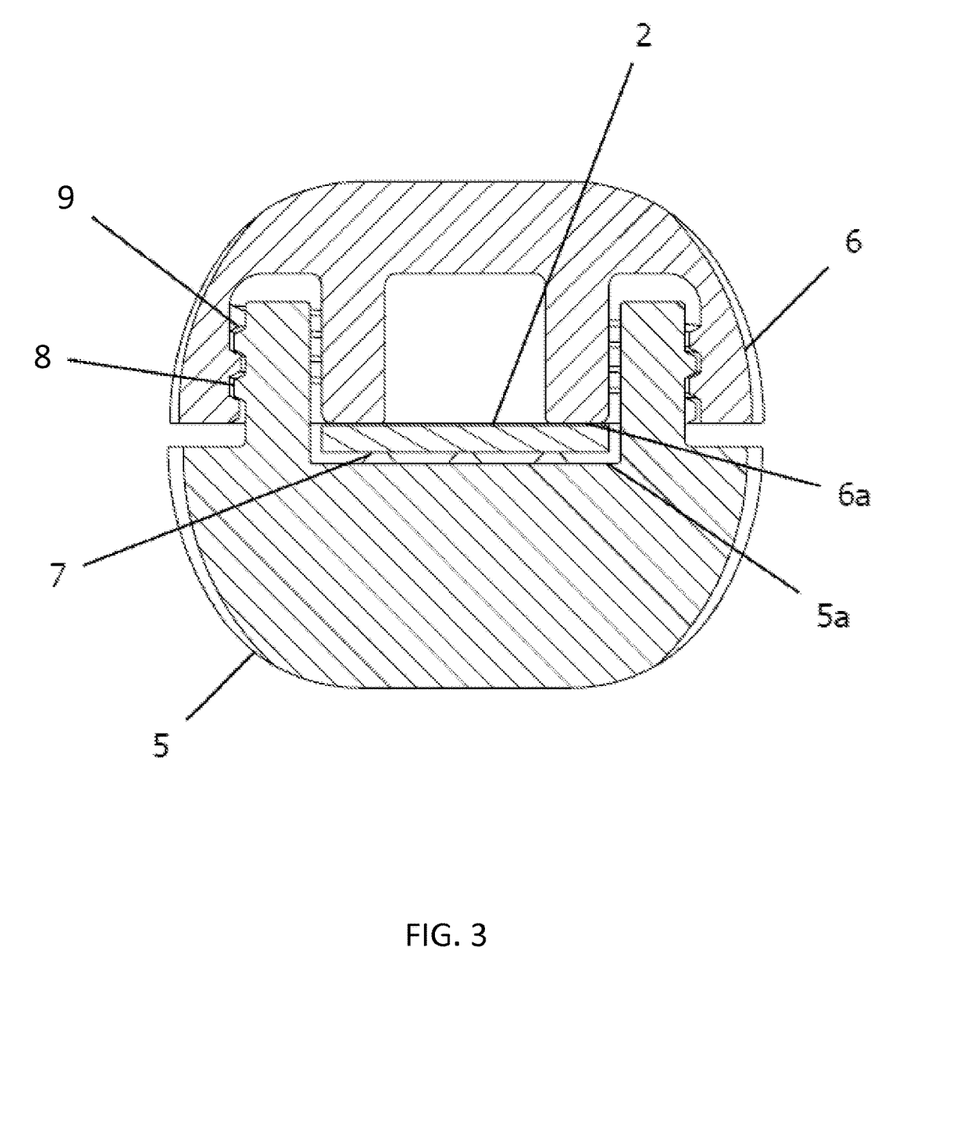
FIG. 3 is a cross-sectional side view of the leash accessory of FIG. 2, the cross-section indicated by arrows XX in FIG. 2.

FIG. 3 is a cross-sectional side view of the leash accessory of FIG. 2, the cross-section indicated by arrows X-X in FIG. 2. Leash accessory 1 comprises two halves, lower half 5 and upper half 6. Leash 2 is sandwiched between lower half 5 and upper half 6.

In the embodiment illustrated in FIG. 3, lower half 5 comprises male thread 8 and gripping surface 5a. Upper half 6 comprises female thread 9 and gripping surface 6a. Lower half 5 and upper half 6 can be screwed together using male thread 8 and female thread 9 to assemble leash accessory 1.

In some embodiments gripping surface 5a and gripping surface 6a are made of the same material. In other embodiments gripping surface 5a and gripping surface 6a are made of different materials. In certain embodiments gripping surface 5a and gripping surface 6a are made of materials that are magnetically attracted to one and other.

Lower half 5 and upper half 6 can be unscrewed from each other so that leash 2 can be placed or inserted between gripping surfaces 5a and 6a of lower half 5 and upper half 6, respectively. When re-assembled, by screwing together lower half 5 and upper half 6, leash accessory grips leash 2. The gripping of leash 2 by lower half 5 and upper half 6 can be sufficient to prevent, or at least reduce the chance of leash 2 from slipping through leash accessory 1 when leash 2 is pulled, for example, by dog 3 of FIG. 1B.

In the embodiment illustrated in FIG. 3, gripping surface 5a on lower half 5 comprises an array of one or more protrusions 7. Protrusions 7 provide additional gripping power to prevent, or at least reduce the chance of leash 2 from slipping when leash accessory 1 is assembled.

Figure 4:
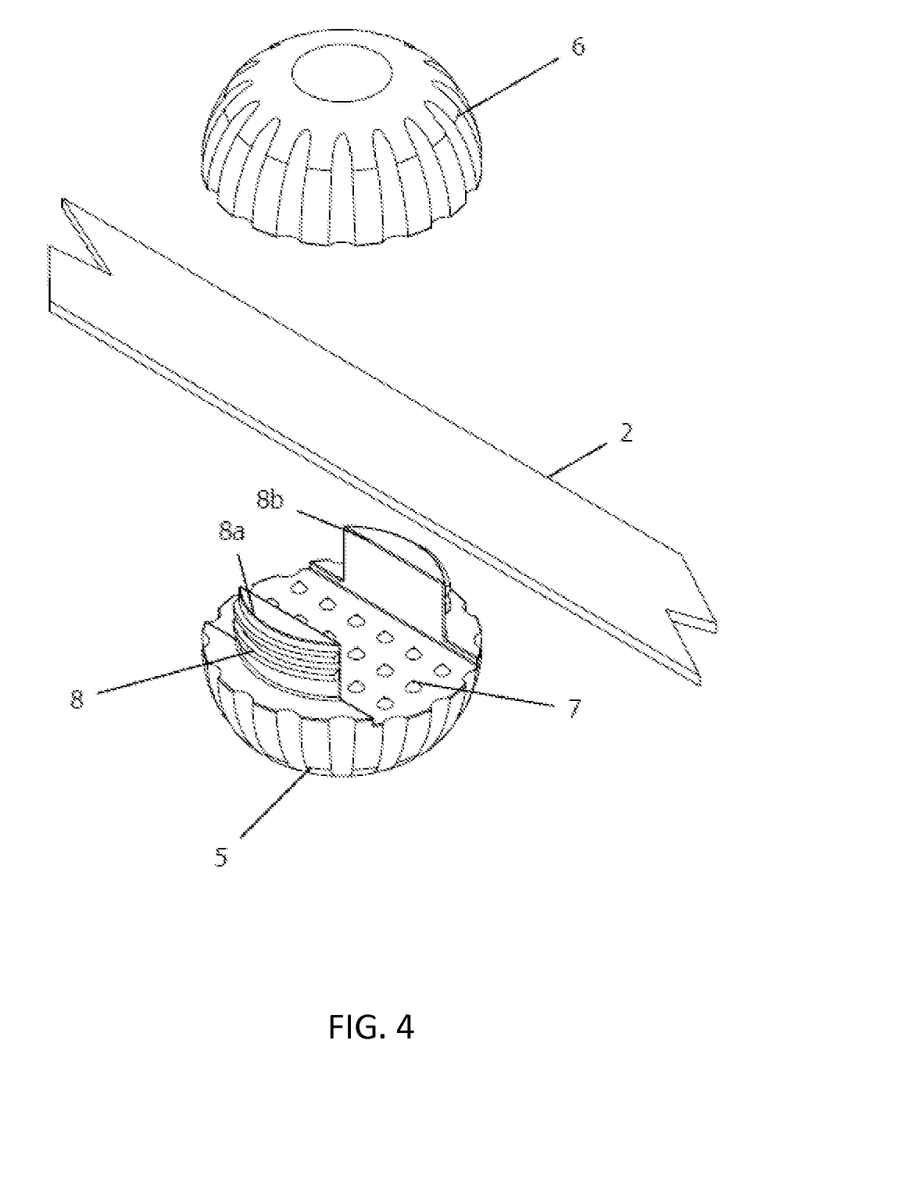
FIG. 4 is an exploded, perspective view, from above, of the leash accessory of FIG. 2.

FIG. 4 is an exploded, perspective view, from above, of leash accessory 1 of FIG. 2. Male thread 8 comprises two arcuate segments 8a and 8b defining a slot therebetween into which leash 2 can be placed or inserted when attaching leash accessory 1 to leash 2.

Figure 5:
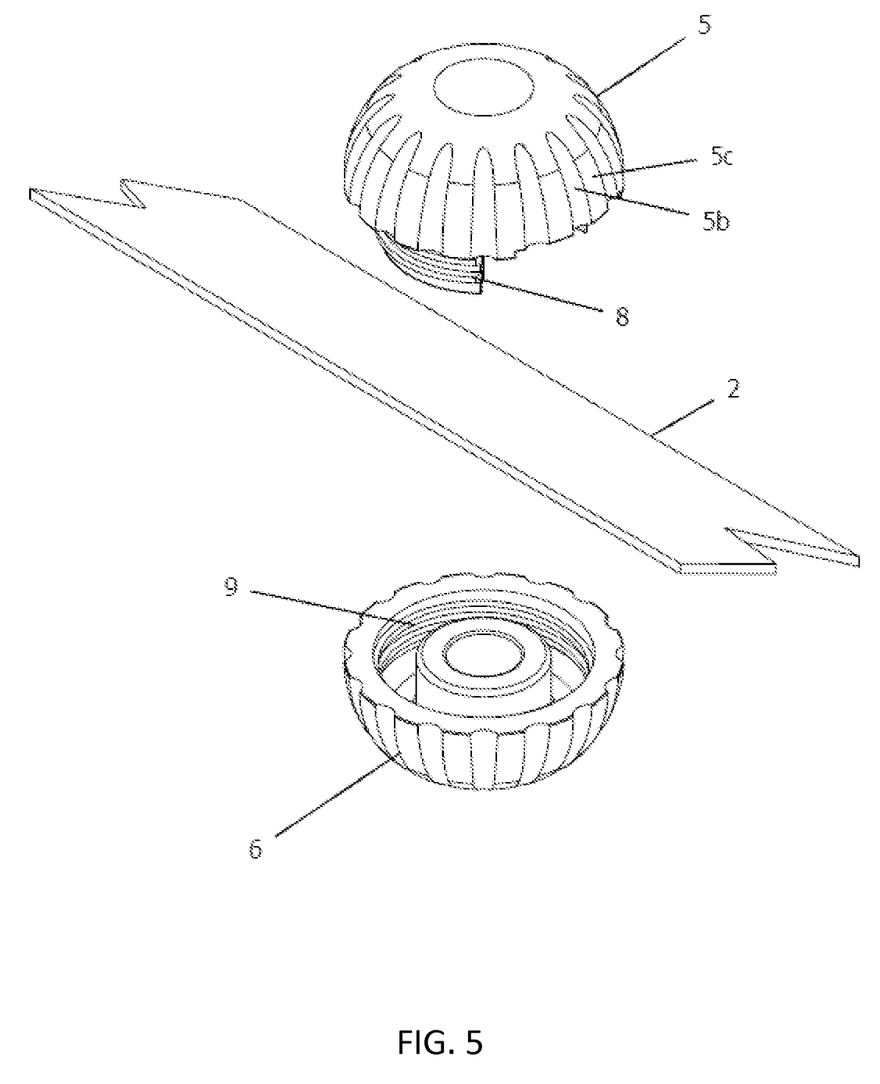
FIG. 5 is an exploded, perspective view, from below, of the leash accessory of FIG. 2.

FIG. 5 is an exploded, perspective view, from below, of leash accessory 1 of FIG. 2. Lower half 5 and upper half 6 comprise indentations and/or ribs (such as indentation 5b and rib 5c) configured to provide additional grip between the user's hand and leash accessory 1. Other configurations of indentations, holes, ribs, raised sections and other features, besides the configuration illustrated in FIG. 5, can be used to achieve the same purpose.

FIG. 6 is a perspective view of another embodiment of a leash accessory, such as the leash accessory shown in FIGS. 1A and 1B. Leash accessory 15 comprises upper part 10 and lower part 11, attached to each other via hinge 12.

Upper part 10 and lower part 11 can be secured to each other via a ratchet comprising bar 13 and tooth 14. Bar 13 comprises a set of angled teeth. Tooth 14 engages in one of the set of angled teeth of bar 13 to prevent, or at least reduce the chance of, leash accessory from opening. Bar 13 can be displaced relative to tooth 14 to release the engagement, and to allow leash accessory 15 to be opened. FIG. 6 shows leash accessory 15 in a closed position.

FIG. 7 is a cross-sectional, perspective view of leash accessory 15 of FIG. 6. FIG. 7 shows leash accessory 15 in the closed position of FIG. 6.

FIG. 8 is a perspective view of leash accessory 15 of FIGS. 6 and 7, opened to accept a leash (not shown in FIG. 8). Gripping surface 11a flower half 11 comprises an array of one or more protrusions 16. Protrusions 16 provide additional gripping power to prevent, or at least reduce the chance of, the leash from slipping when leash accessory 15 is assembled and closed.

Though not illustrated in the embodiment of FIG. 8, leash accessory 15 can comprise indentations, holes, and raised sections to provide additional grip between the user's hand and leash accessory 15.

Leash accessories 1 and 15 can also be used as a toy, such as a ball, when removed from the lead. For this purpose, a thick, durable, rubberized outer shell can be used in manufacture.

Leash accessories 1 and 15 can incorporate internal compartments for carrying items such as dog treats, water, clean-up bags, and the like. Leash accessories 1 and 15 can be sized to accommodate internal compartments as desired. In another embodiment, leash accessories 1 and 15 can comprise a point of attachment (such as a clip, thread, loop or eye) suitable for attaching a separate bag or container to house items such as dog treats, water, clean-up bags, and the like.

In another embodiment, the leash accessory comprises a GPS transceiver. In yet another embodiment, the leash accessory comprises one or more lights such as LED lamps.

Figure 9:
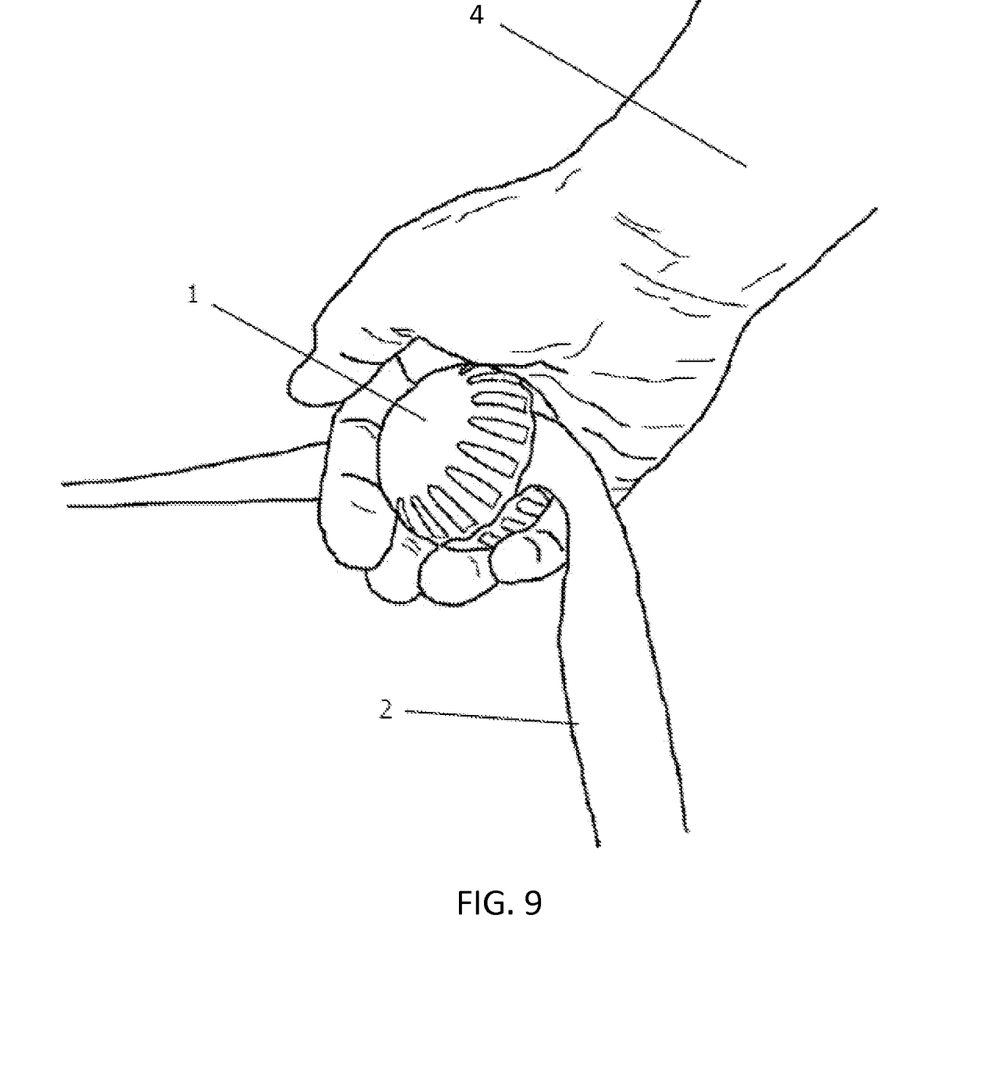
FIG. 9 is a line drawing illustrating the leash accessory of FIGS. 1A-5 in use.

FIG. 9 illustrates leash accessory 1 of FIGS. 1A, 18, and 2-5 in use. Leash accessory 1 is held by user 4. Leash accessory 1 is removably attached to leash 2. Leash accessory 15 can be used in the same way as illustrated in FIG. 9 for leash accessory 1.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A detachable leash handle comprising:
   (a) a first subassembly comprising
      (i) a first body; and
      (ii) a first gripping surface;
   (b) a second subassembly comprising
      (i) a second body; and
      (ii) a second gripping surface; and
   (c) an adjustable fastening mechanism operable to urge said first gripping surface toward said second gripping surface to secure a leash interposed between said first and said second gripping surfaces;
   wherein said adjustable fastening mechanism (c) comprises:
      (i) a male thread on said first subassembly; and
      (ii) a matching female thread on said second subassembly,
   wherein said male thread comprises two arcuate segments extending from said first body, said two arcuate segments defining a slot therebetween, said slot able to accommodate said leash interposed between said first and said second gripping surfaces, said two arcuate segments each having an upward sidewall extending substantially entirely parallel to a longitudinal axis of said first body; and
   wherein said first gripping surface is urged toward said second gripping surface by rotating said male thread within said matching female thread.

2. The detachable leash handle of claim 1, wherein said first and said second bodies are substantially hemispherical in shape.

3. The detachable leash handle of claim 1, wherein said first and said second gripping surfaces are substantially planar, and wherein said leash is a strap leash.

4. The detachable leash handle of claim 1, wherein said first and said second gripping surfaces are concave and cooperate to define a cylindrical slot, and wherein said leash is a cord leash.

5. The detachable leash handle of claim 1, wherein at least one of said first and said second gripping surfaces comprises an array of protrusions.

6. The detachable leash handle of claim 1, wherein at least one of said first and said second gripping surfaces is a ribbed surface.

7. The detachable leash handle of claim 1, wherein said first and said second bodies each comprise an exterior surface, said exterior surface comprising one or more indentations.

8. The detachable leash handle of claim 1, wherein said detachable leash handle is operable as a dog toy when detached.

9. The detachable leash handle of claim 1, further comprising:
   (d) an internal compartment configured to hold at least one of a clean-up bag and a pet treat.

10. The detachable leash handle of claim 1, further comprising:
    (d) a point of attachment configured to attach an accessory to said leash handle.

11. An animal restraint assembly comprising:
    (a) a detachable leash handle comprising:
       (i) a first subassembly comprising
          (1) a first body; and
          (2) a first gripping surface; and
       (ii) a second subassembly comprising
          (1) a second body; and
          (2) a second gripping surface; and
       (iii) an adjustable fastening mechanism; and
    (b) a leash, interposed between said first and said second gripping surfaces,
    wherein said adjustable fastening mechanism is operable to urge said first gripping surface toward said second gripping surface to secure said leash; wherein said adjustable fastening mechanism (iii) comprises:
       (1) a male thread on said first subassembly; and
       (2) a matching female thread on said second subassembly,
    wherein said male thread comprises two arcuate segments extending from said first body, said two arcuate segments defining a slot therebetween, said slot able to accommodate said leash, said two arcuate segments each having an upward sidewall extending substantially entirely parallel to a longitudinal axis of said first body; and
    wherein said first gripping surface is urged toward said second gripping surface by rotating said male thread within said matching female thread to secure said leash.

12. The animal restraint assembly of claim 11, further comprising:
    (c) at least one of a collar and a harness attached to said leash.

* * * * *